US012429939B2

(12) United States Patent
 Chavali

(10) Patent No.: US 12,429,939 B2
(45) Date of Patent: *Sep. 30, 2025

(54) SYSTEMS AND METHODS FOR ENABLING FACIAL BROWSING OF A DISPLAY BASED ON MOVEMENT OF FACIAL FEATURES

(71) Applicant: Verizon Patent and Licensing Inc., Basking Ridge, NJ (US)

(72) Inventor: Saikiran N. Chavali, Pune (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/612,286

(22) Filed: Mar. 21, 2024

(65) Prior Publication Data

US 2024/0231475 A1    Jul. 11, 2024

Related U.S. Application Data

(63) Continuation of application No. 18/057,027, filed on Nov. 18, 2022, now Pat. No. 11,960,633.

(51) Int. Cl.
| | | |
|---|---|---|
| *G06F 3/00* | (2006.01) | |
| *G06V 10/82* | (2022.01) | |
| *G06V 40/16* | (2022.01) | |
| *G06V 40/20* | (2022.01) | |

(52) U.S. Cl.
CPC .......... *G06F 3/005* (2013.01); *G06V 10/82* (2022.01); *G06V 40/168* (2022.01); *G06V 40/20* (2022.01)

(58) Field of Classification Search
CPC ...... G06F 3/005; G06V 40/168; G06V 10/82; G06V 40/20
See application file for complete search history.

(56) References Cited

U.S. PATENT DOCUMENTS

| | | |
|---|---|---|
| 10,354,126 B1 | 7/2019 | Nagalla |
| 11,221,680 B1* | 1/2022 | Clements ................ G06F 3/017 |
| 11,960,633 B1* | 4/2024 | Chavali ................ G06V 40/20 |
| 2015/0192991 A1 | 7/2015 | Dal Mutto et al. |
| 2016/0299661 A1* | 10/2016 | Alpert .................... G06T 17/05 |
| 2019/0265784 A1 | 8/2019 | Akahori |
| 2022/0072425 A1* | 3/2022 | Orlandi ................ A63F 13/213 |
| 2022/0113991 A1* | 4/2022 | Singh .................. G06F 11/3438 |
| 2022/0179618 A1* | 6/2022 | Shin ...................... G06F 3/0346 |
| 2022/0327755 A1 | 10/2022 | Wedig |
| 2023/0015224 A1* | 1/2023 | Lin ...................... G06V 40/172 |
| 2023/0171370 A1 | 6/2023 | Tenback et al. |
| 2023/0283861 A1* | 9/2023 | Taylor .................. H04N 21/854 725/61 |

* cited by examiner

*Primary Examiner* — Lixi C Simpson

(57) ABSTRACT

A user device may receive an image of a user, and may process the image, with a model, to identify a face of the user and key markers of the face. The user device my process the face and the key markers, with the model, to identify features of the face, and may calculate a z-index representing a distance between the face and a display. The user device may calculate left and right face rotation along an x-axis of the display, and may calculate up and down face rotation along a y-axis of the display, based on the features. The user device may calculate an x-position and a y-position of a cursor on the display based on the left and right face rotation, the up and down face rotation, and the z-index, and may provide the x-position and the y-position of the cursor to the display.

20 Claims, 13 Drawing Sheets

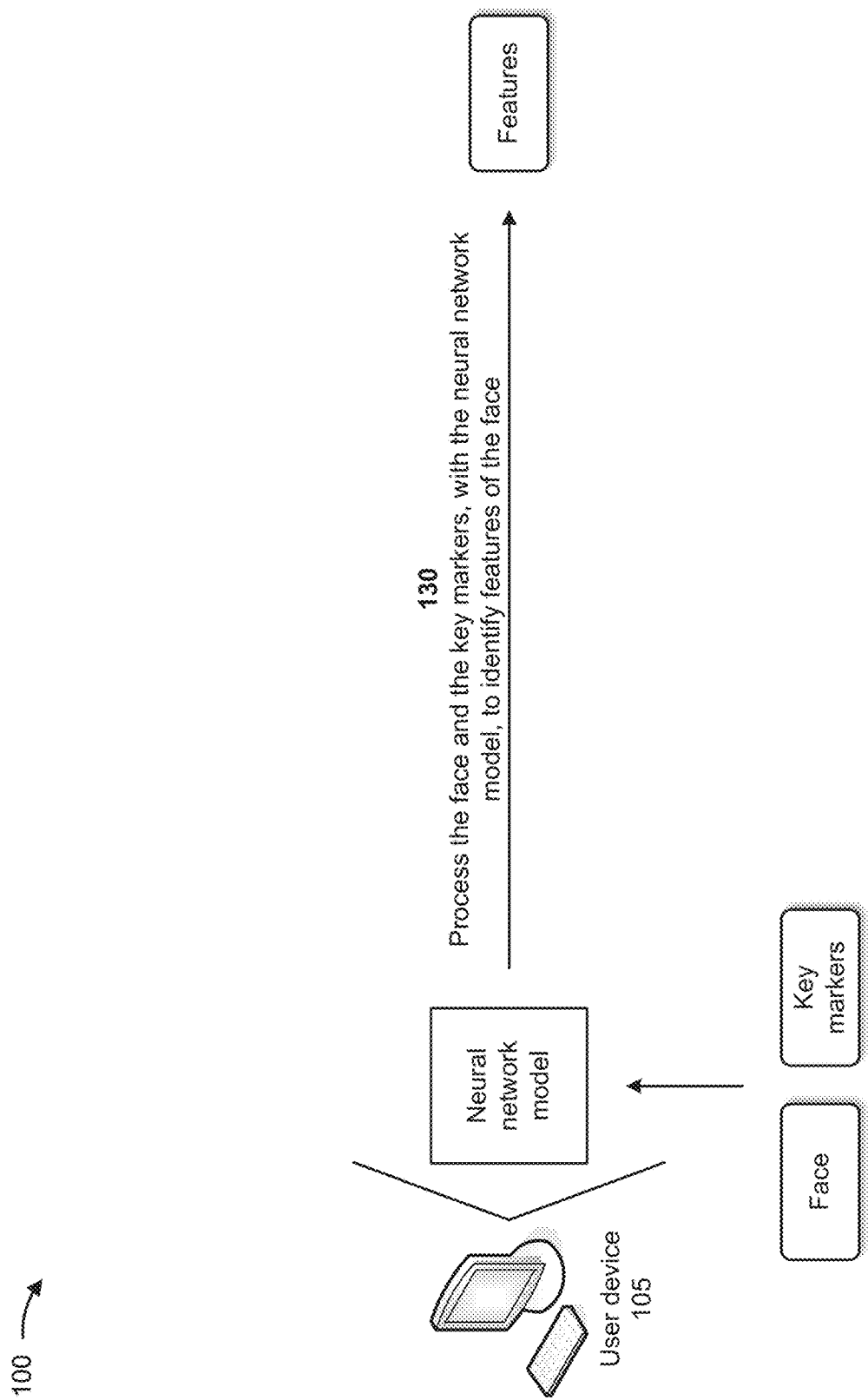

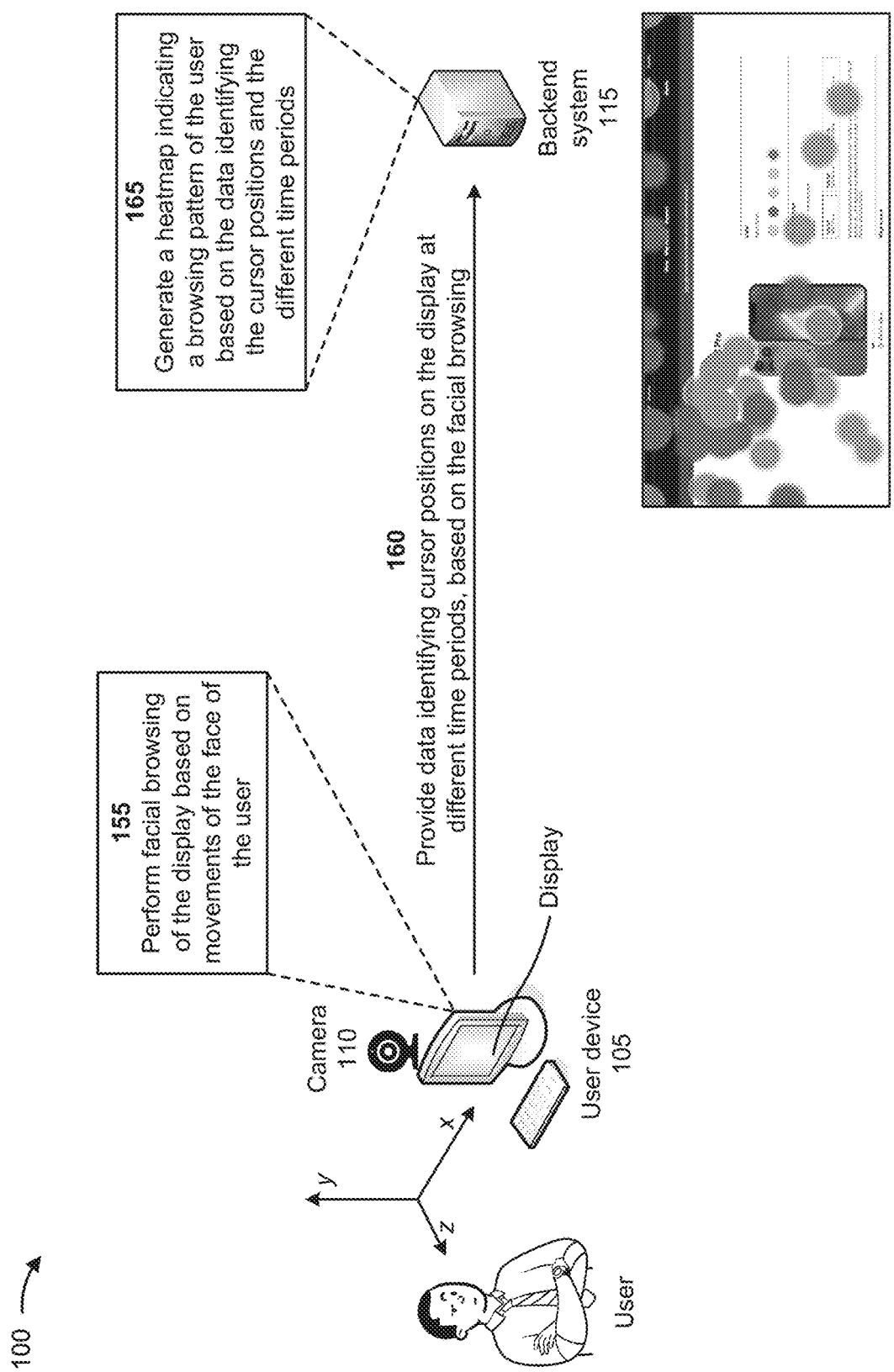

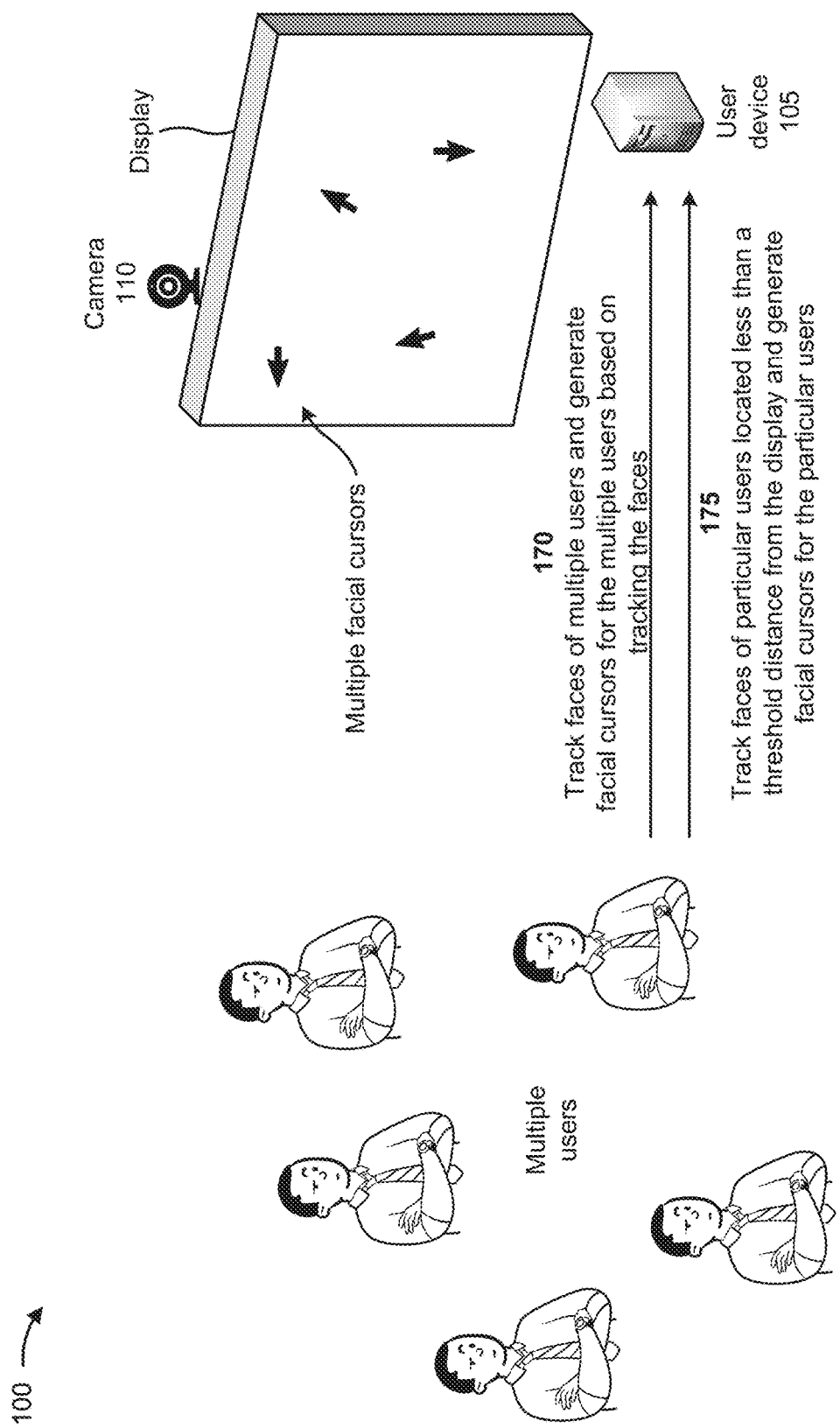

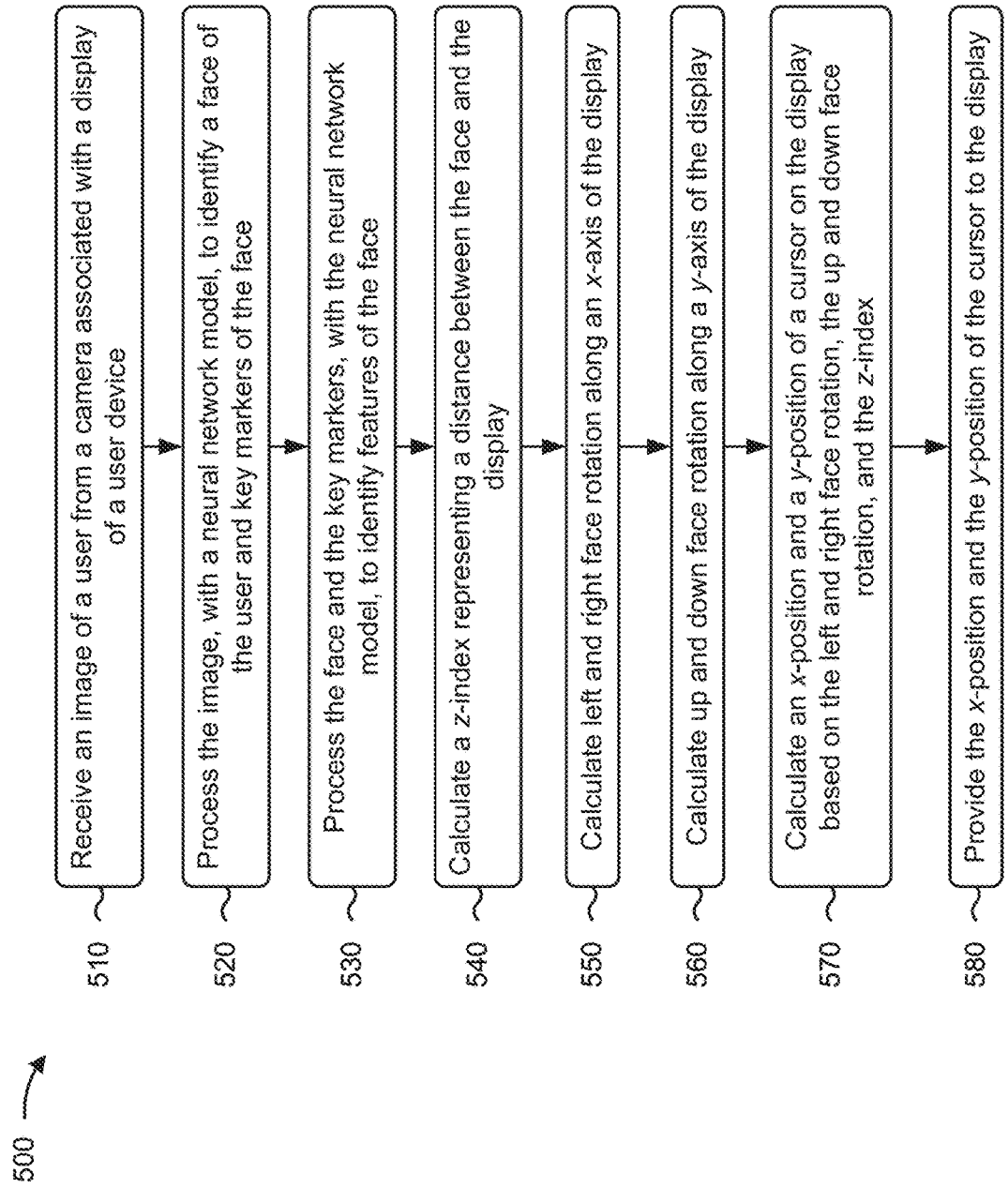

SYSTEMS AND METHODS FOR ENABLING FACIAL BROWSING OF A DISPLAY BASED ON MOVEMENT OF FACIAL FEATURES

RELATED APPLICATION

This application is a continuation of U.S. patent application Ser. No. 18/057,027, entitled "SYSTEMS AND METHODS FOR ENABLING FACIAL BROWSING OF A DISPLAY BASED ON MOVEMENT OF FACIAL FEATURES," and filed Nov. 18, 2022, which is incorporated herein by reference in its entirety.

BACKGROUND

Existing devices provide user interface (e.g., webpage) browsing capabilities using a mouse or a touchscreen, and may track browsing analytics, such as clickstream data (e.g., mouse clicks, pauses, or mouse hovers), on every webpage. The devices may record a user session webpage by webpage and may store the user session for analysis from a business perspective.

BRIEF DESCRIPTION OF THE DRAWINGS

FIGS. 1A-1I are diagrams of an example associated with enabling facial browsing of a display based on movement of facial features of a user.

FIG. 5 is a flowchart of an example process for enabling facial browsing of a display based on movement of facial features of a user.

DETAILED DESCRIPTION OF EXAMPLE EMBODIMENTS

Figure 1A:
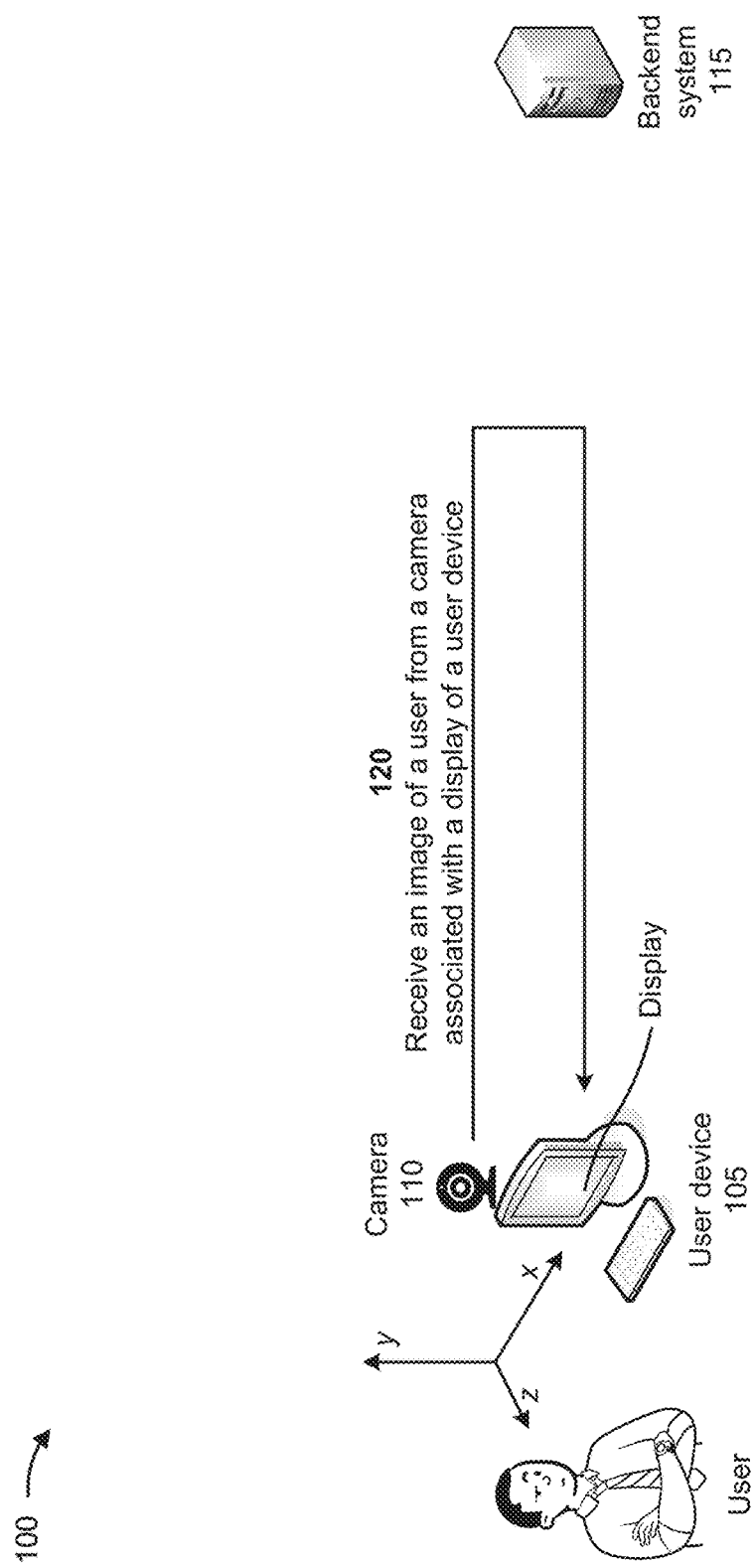

The following detailed description of example implementations refers to the accompanying drawings. The same reference numbers in different drawings may identify the same or similar elements.

Devices that track browsing analytics and user sessions require a hardware peripheral (e.g., a mouse, a touchpad, a touchscreen, a trackball, and/or the like) for browsing. However, such devices are unable to determine where users are looking or focusing (e.g., on webpages) if the users do not utilize the hardware peripheral and are just observing sections of webpages. If the observed sections are points of interest for the users, the devices may be unable to determine that the observed sections of points of interest. Thus, current techniques for tracking browsing may be insufficient and analytics may consume computing resources (e.g., processing resources, memory resources, communication resources, and/or the like), networking resources, and/or other resources associated with generating poor insights associated with user browsing patterns, generating poor predictions of user intent based on the poor insights, providing incorrect recommendations to users due to the poor insights, providing incorrect recommendations to an online purchasing system due to the poor insights, and/or the like.

Some implementations described herein provide a user device that enables facial browsing of a display based on movement of facial features of a user. For example, the user device may receive an image of a user from a camera associated with a display of the user device, and may process the image, with a neural network model, to identify a face of the user and key markers of the face. The user device may process the face and the key markers, with the neural network model, to identify features of the face, and may calculate a z-index representing a distance between the face and the display, based on the features. The user device may calculate left and right face rotation along an x-axis of the display, based on the features, and may calculate up and down face rotation along a y-axis of the display, based on the features. The user device may calculate an x-position and a y-position of a cursor on the display based on the left and right face rotation, the up and down face rotation, and the z-index, and may provide the x-position and the y-position of the cursor to the display. In some implementations, the user may be required to opt in before facial browsing of a display based on movement of facial features of a user is enabled on the user device.

In this way, the user device enables facial browsing of a display based on movement of facial features of a user. For example, the user device may provide facial browsing that enables a user to utilize a user face to control and perform actions similar to actions performed by a hardware peripheral, such as hovering, navigating a webpage, scrolling on webpage, selecting objects on a webpage, and/or the like. The user device may generate insights associated with where a user is looking on a screen or webpage based on the facial browsing. The user device may enable a user to navigate and control actions based on facial movements, which facilitates the user experience of browsing. Thus, the user device may conserve computing resources, networking resources, and/or other resources that would have otherwise been consumed by generating poor insights associated with user browsing patterns, generating poor predictions of user intent based on the poor insights, providing incorrect recommendations to users due to the poor insights, providing incorrect recommendations to an online purchasing system due to the poor insights, and/or the like.

FIGS. 1A-1I are diagrams of an example 100 associated with enabling facial browsing of a display based on movement of facial features of a user. As shown in FIGS. 1A-1I, example 100 includes a user device 105 (e.g., associated with a user and including a display), a camera 110, and a backend system 115. In some implementations, the camera 110 may be included in the user device 105, separate from the user device 105, and/or the like. Further details of the user device 105, the camera 110, and the backend system 115 are provided elsewhere herein.

As shown in FIG. 1A, and by reference number 120, the user device 105 may receive an image of a user from the camera 110 associated with the display of the user device 105. For example, the camera 110 may capture images (e.g., video) of the user while the user is looking at the display of the user device 105. The camera 110 may provide the images to the user device 105, and the user device 105 may receive the images. In some implementations, the user device 105 may continuously receive the images from the camera 110, may periodically receive the images from the camera 110, and/or the like. The user device 105 may process each of the images as described below in connection with a single image. As further shown in FIG. 1A, the user may be oriented with the display such that the user is located a distance from the display along a z-axis. The user may scan the display from left to right or right to left along an x-axis, and may scan the display from top to bottom or bottom to top along a y-axis. A width of the display may be provided along the x-axis and a length of the display may be provided along the y-axis. In some implementations, the camera may begin capturing images of the user based on a particular application being initiated on the user device, such as a browser, based on the user activating a facial navigation feature on the user device, and/or the like.

Figure 1B:
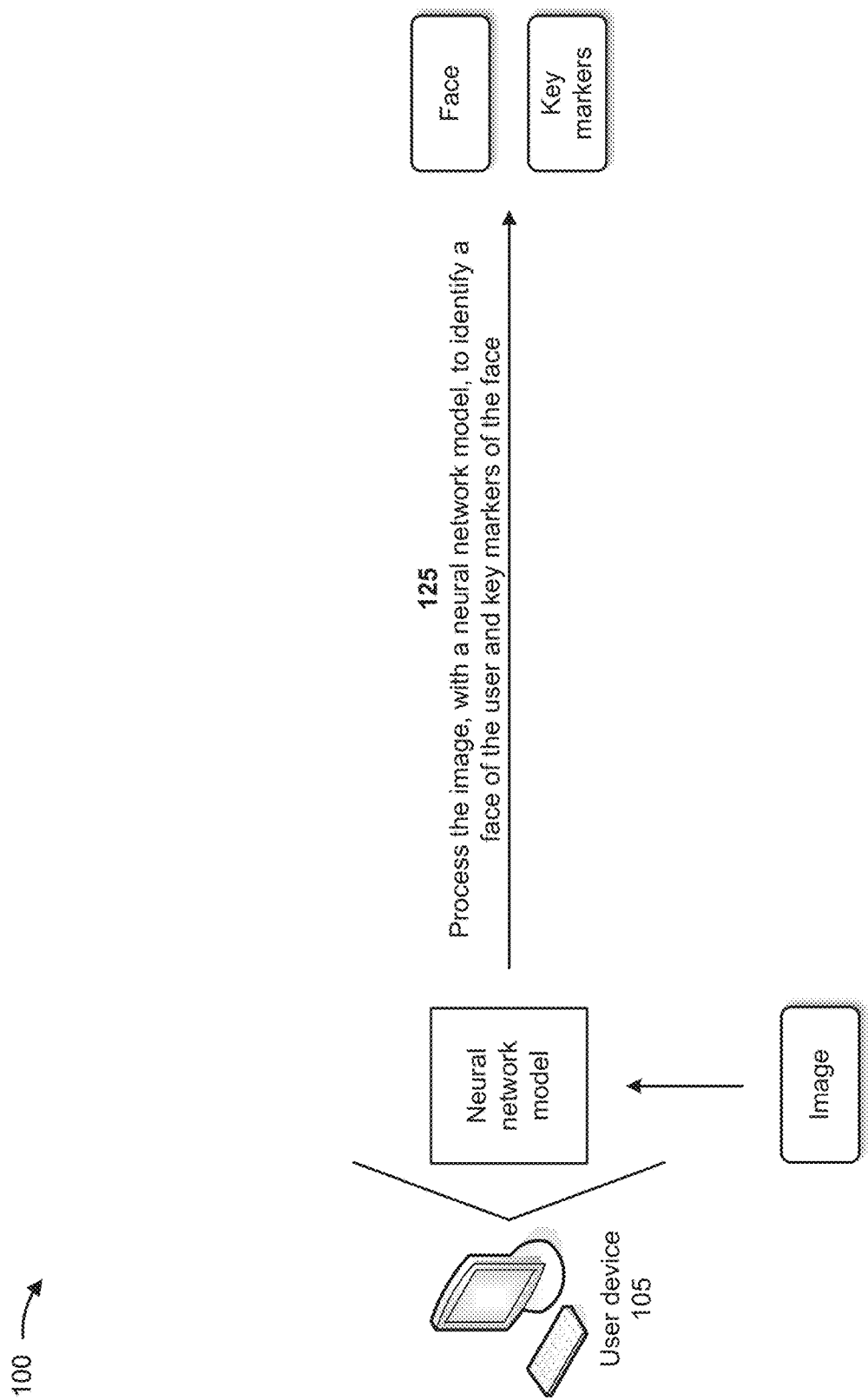

As shown in FIG. 1B, and by reference number 125, the user device 105 may process the image, with a neural network model, to identify a face of the user and key markers of the face. For example, the user device 105 may include or have access to a neural network model. In some implementations, the neural network model may include an artificial neural network (ANN) model, a convolution neural network (CNN) model, or a recurrent neural network (RNN) model. The user device 105 may train the neural network model, may receive a trained neural network model, may update the neural network model, may provide information for updating the neural network model to another device that updates the neural network model, and/or the like. Further details of training the neural network model are described below in connection with FIG. 2.

In some implementations, the user device 105 may utilize the neural network model to identify the face of the user and key markers (e.g., points) of the face, based on the image. Each key marker may be specified by a real-valued pair (x, y) in a space of pixel indices and may identify different locations of a face. For example, the key markers may include points identifying a left portion of a forehead, a right portion of the forehead, a left ear, a right ear, a center of a left eye, a center of a right eye, an inner corner of the left eye, an outer corner of the left eye, an inner corner of the right eye, an outer corner of the right eye, an inner end of a left eyebrow, an outer end of the left eyebrow, an inner end of a right eyebrow, an outer end of the right eyebrow, a nose tip, a left corner of a mouth, a right corner of the mouth, a center of a top lip of the mouth, a center of a bottom lip of the mouth, and/or the like. In some implementations, the neural network model may utilize the key markers to identify features of the face (e.g., a nose, a left portion of a forehead, a right portion of the forehead, a left ear, a right ear, an upper lip, a lower lip, and/or the like), as described below.

As shown in FIG. 1C, and by reference number 130, the user device 105 may process the face and the key markers, with the neural network model, to identify features of the face. For example, the user device 105 may utilize the neural network model to identify the features of the face based on the face and the key markers identified by the neural network model. In some implementations, the features of the face may include a nose of the face, a left portion of a forehead of the face, a right portion of the forehead of the face, a left ear of the face, a right ear of the face, an upper lip of the face, a lower lip of the face, a left eye of the face, a right eye of the face, an left eyebrow of the face, a right eyebrow of the face, and/or the like.

Figure 1D:
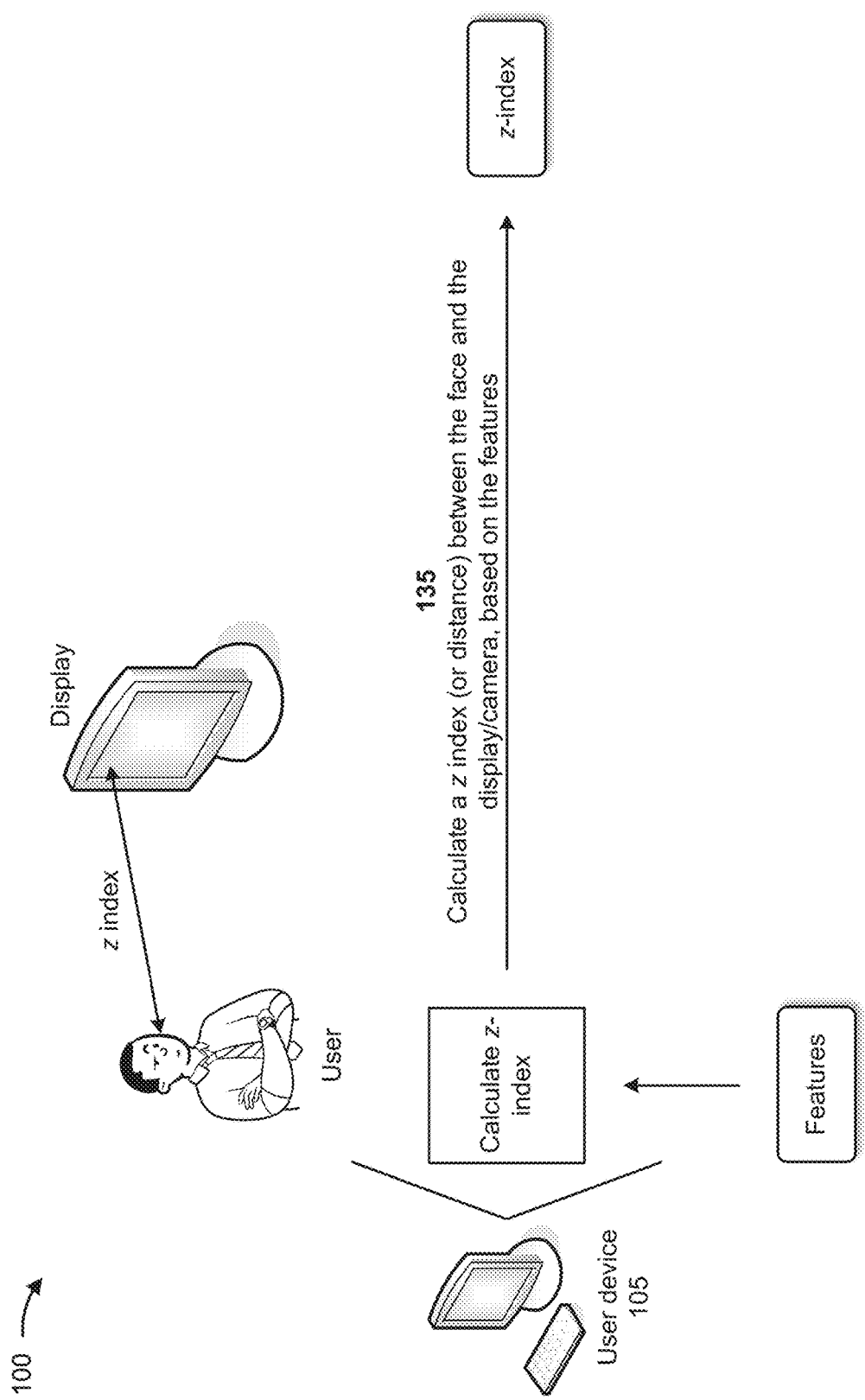

As shown in FIG. 1D, and by reference number 135, the user device 105 may calculate a z-index (or distance) between the face and the display and/or the camera 110, based on the features. For example, as described above, the face of the user may be located a distance (e.g., the z-index along the z-axis) from the display and/or the camera 110, and the distance may vary over time based on the user moving toward the display and/or the camera 110 or moving away from the display and/or the camera 110. In some implementations, when calculating the z-index representing the distance between the face and the display and/or the camera 110, the user device 105 may calculate an area of triangle formed by a left portion of a forehead of the face, a right portion of the forehead, and a nose of the face. In such implementations, the user device 105 may determine a width and a height of a display area of the display, and may calculate the z-index by dividing each of the width and the height by the area of the triangle.

Figure 1E:
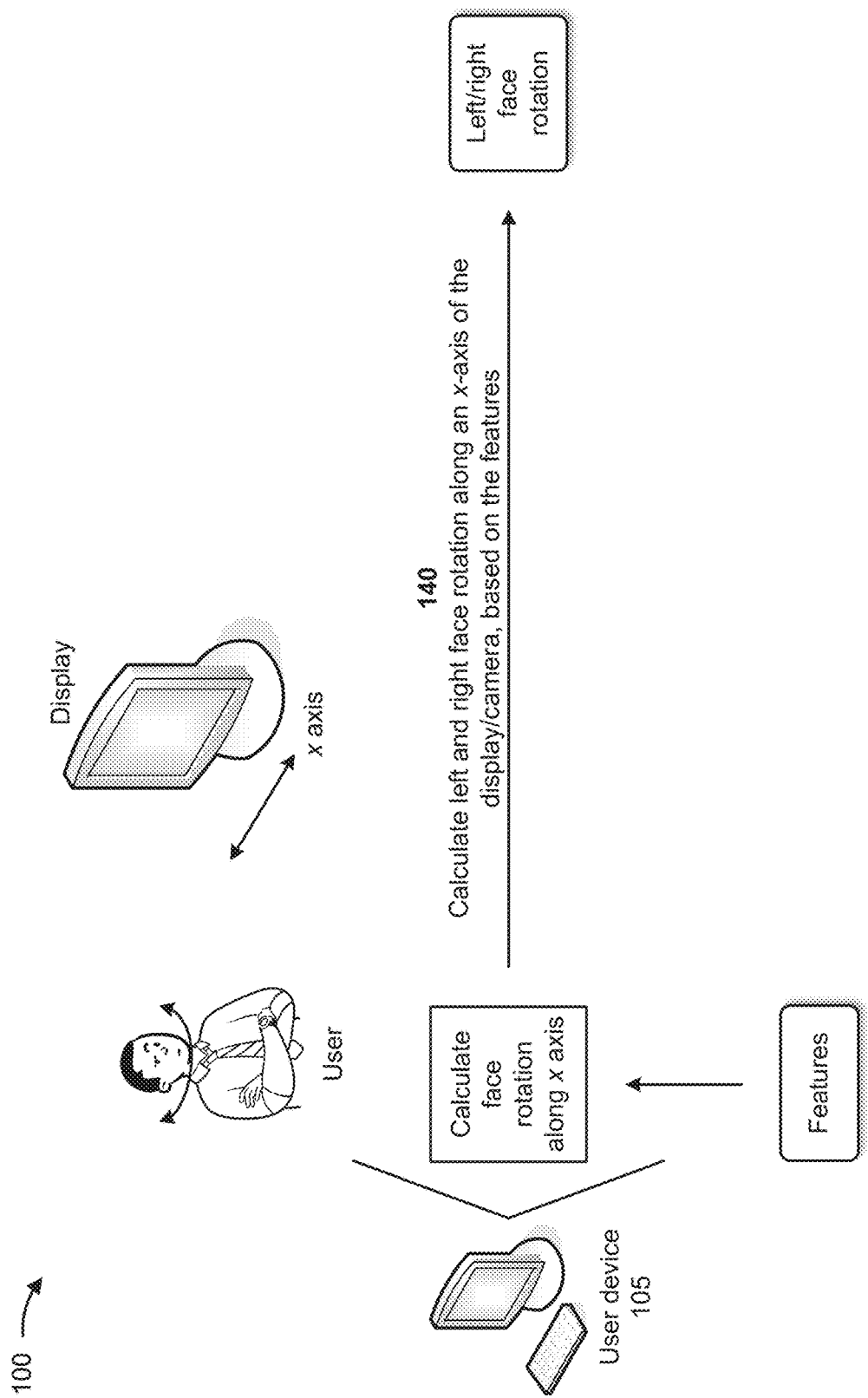

As shown in FIG. 1E, and by reference number 140, the user device 105 may calculate left and right face rotation along the x-axis of the display and/or the camera 110, based on the features. For example, the user's face may rotate to the left (e.g., along the x-axis of the display) to view a left portion of the display or the user's face may rotate to the right (e.g., along the x-axis of the display) to view a right portion of the display. In some implementations, when calculating the left and right face rotation along the x-axis of the display and/or the camera 110, the user device 105 may determine that the face is looking straight at the display at a zero angle, may identify a first angle (e.g., +180°) indicating that the face is pointing right, and may identify a second angle (e.g., −180°) indicating that the face is pointing left. The user device 105 may calculate a first x distance between a nose of the face and a left portion of a forehead of the face, based on the first angle and the second angle, and may calculate a second x distance between the nose of the face and a right portion of the forehead of the face, based on the first angle and the second angle. The user device 105 may divide the first x distance by the second x distance to obtain a first value, and may subtract the first value from one (1) to obtain a second value. The user device 105 may calculate a left face rotation when the second value is greater than zero, or may calculate a right face rotation when the second value is less than or equal to zero.

Figure 1F:
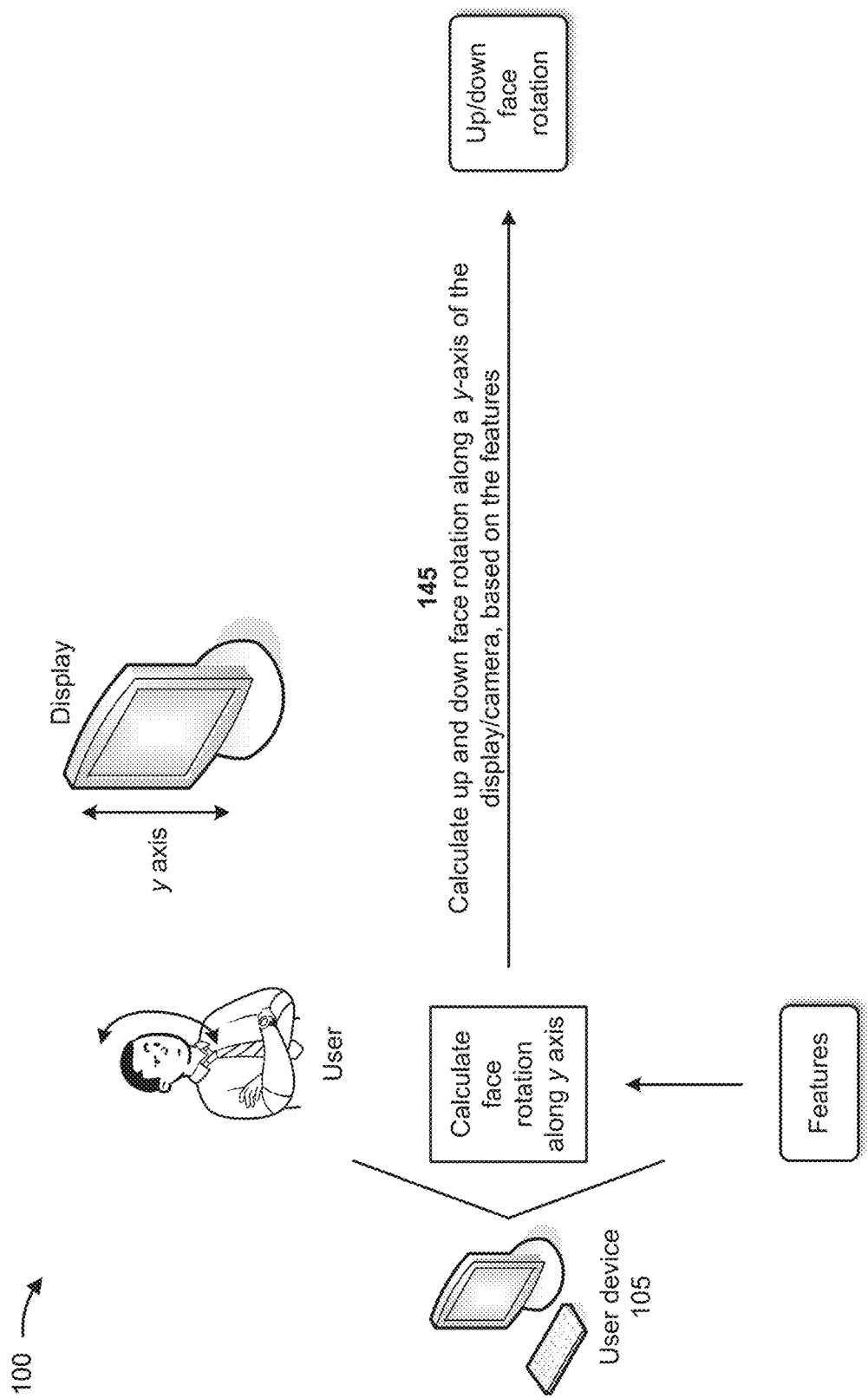

As further shown in FIG. 1F, and by reference number 145, the user device 105 may calculate up and down face rotation along a y-axis of the display and/or the camera 110, based on the features. For example, the user's face may rotate up (e.g., along the y-axis of the display) to view a top portion of the display or the user's face may rotate down (e.g., along the y-axis of the display) to view a bottom portion of the display. In some implementations, when calculating the up and down face rotation along the y-axis of the display and/or the camera 110, the user device 105 may identify locations of a left ear of the face and a right ear of the face, and may calculate a first distance between a left portion of a forehead of the face and a right portion of the forehead of the face. In such implementations, the user device 105 may calculate second distances between a nose of the face and the locations of the left ear and the right ear, and may calculate the up and down face rotation based on the first distance and the second distances.

Figure 1G:
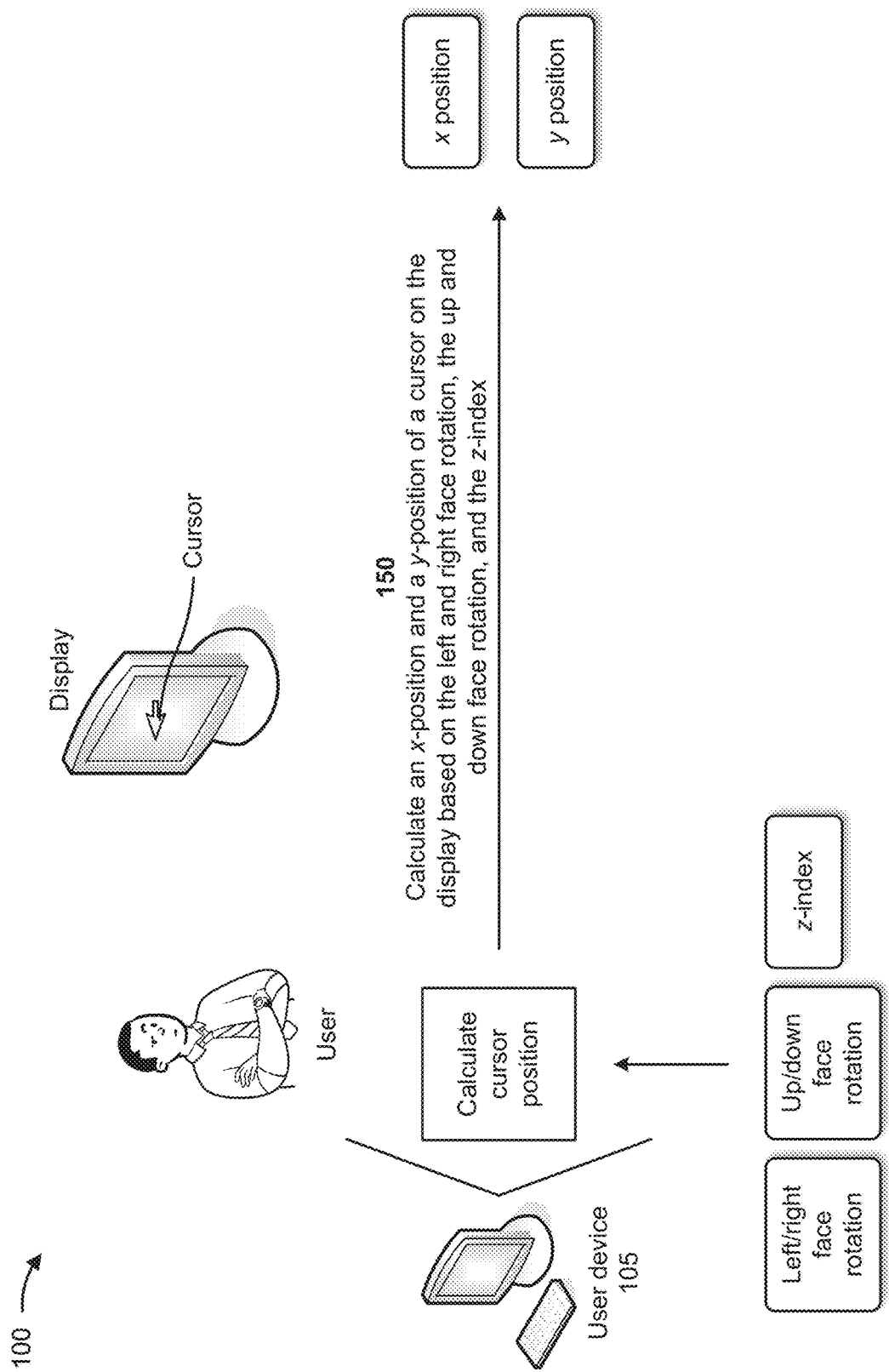

As shown in FIG. 1G, and by reference number 150, the user device 105 may calculate an x-position and a y-position of a cursor on the display based on the left and right face rotation, the up and down face rotation, and the z-index. For example, the user device may utilize the left and right face rotation, the up and down face rotation, and the z-index to specify a location of the cursor to be displayed by the display. The cursor location may provide an indication of where the user's face is focusing on the display. In some implementations, the user device 105 may calculate the location (e.g., the x-position and the y-position) of the cursor on the display based on the left and right face rotation, the up and down face rotation, and the z-index. In some implementations, when calculating the x-position and the y-position of the cursor on the display based on the left and right face rotation, the up and down face rotation, and the z-index, the user device 105 may multiply the left and right face rotation and a coefficient, based on the z-index and a width and a height of a display area of the display, to obtain a first value. The user device 105 may multiply the up and down face rotation and the coefficient to obtain a second value, and may calculate the x-position and the y-position of the cursor based on the first value and the second value. The user device 105 may provide the x-position and the y-position of the cursor to the display and the display may present the cursor at the x-position and the y-position.

As shown in FIG. 1H, and by reference number 155, the user device 105 may perform facial browsing of the display based on movements of the face of the user. For example, as the user's face moves, the user device 105 may change the x-position and the y-position of the cursor based on the movement of the face. The user device 105 may enable the user to perform facial browsing of the display based on movement of the face, facial gestures, and/or the like. In some implementations, when performing the facial browsing of the display, the user device 105 may zoom in on the display based on the face moving toward the display, may zoom out of the display based on the face moving away from the display, may pan across the display based on the face moving left or right relative to the display, may select an element provided by the display based on the face staring at the element for a threshold time period, may perform a selection function based on the face looking at the display and smiling, may perform an accept option based on the face vertically nodding, may perform a decline option based on the face horizontally shaking, may perform a swipe function based on the face quickly moving in one direction, and/or the like. In some implementations, the facial gestures and what happens on the display in relation to a user interface may be configurable by the user. For example, the user may configure the user device 105 to cause detection of a winking of the left eye to be equivalent to clicking a left mouse button, and/or the like.

With regard to zooming in and out, the user device 105 may enable the user to zoom into a detail by moving closer to the display and to zoom out by moving away from the display. The user device 105 may enable the user to pan a scene of the display with ease using facial movements. The user device 105 may identify the lips of the face, and when the midpoint of the upper lip and the end of the upper lip increases (e.g., when to a threshold), the user device 105 may detect a smile. When the cursor is pointing at an element on the display and the user smiles, the user device 105 may perform a selection function. The user device 105 may track facial rotations to understand a direction and a frequency of the direction that user makes to the display. If user switches the direction (e.g., from left to right, from right to left, from up to down, from down to up), the user device 105 may calculate a switch value, and may determine that the user is swiping left, right, up, or down when the switch value is less than a threshold (e.g., five milliseconds). In some implementations, the user may utilize facial browsing to hover on an element (e.g., products on a webpage), may move to different products, and may smile to automatically compare the different products. This may enhance a user experience and may provide for quick comparison of products.

As further shown in FIG. 1H, and by reference number 160, the user device 105 may provide, to the backend system 115, data identifying cursor positions on the display at different time periods, based on the facial browsing. For example, the user may utilize facial browsing to provide the cursor at different positions on the display at different time periods (e.g., and for different durations). The user device 105 may track the data identifying the cursor positions, and may provide the data identifying the cursor positions to the backend system 115. In some implementations, the user device 105 may provide, to the backend system 115, data identifying cursor positions created with a hardware peripheral (e.g., a mouse) by the user. In some implementations, the user device 105 may display a semi-transparent cursor so that the user knows where the cursor is located on the display or that what the user device 105 is detecting with respect to movement of the user's face.

As further shown in FIG. 1H, and by reference number 165, the backend system 115 may generate a heatmap indicating a browsing pattern of the user based on the data identifying the cursor positions and the different time periods. For example, the backend system 115 may utilize the data identifying the cursor positions and the different time periods (e.g., and the data identifying cursor positions created with a hardware peripheral) to generate the heatmap indicating the browsing pattern of the user. In some implementations, the user device 105 may generate the heatmap based on the data identifying the cursor positions and the different time periods and the data identifying cursor positions created with a hardware peripheral. The heatmap may provide an indication of a journey from where the user started (e.g., from which part of a webpage) and how the user navigated to different portions of the webpage using facial browsing, which may identify interests of the user. This may provide in depth insights of what the user was looking at while the user was not using the hardware peripheral and how long the user was spending. In some implementations, the backend system 115 may generate a recommendation (e.g., for a product and/or a service) for the user based on the heatmap, and provide the recommendation to the user device 105. Alternatively, or additionally, the user device 105 may generate a recommendation for the user based on the heatmap, and may provide the recommendation to the display.

In some implementations, the user device 105 may utilize movements of the user's forehead, along the camera 110 and the display, and the distance of the user from the display to enable facial browsing. Even if the user is standing, sitting, is close to the camera 110, or is far from the camera 110, the forehead may point to the same location on the display. The user device 105 may be utilized for browsing two-dimensional surfaces (e.g., a display screen) or three-dimensional surfaces (e.g., an aisle with products).

As shown in FIG. 1I, and by reference number 170, the user device 105 may track faces of multiple users (e.g., as described above in connection with a single user) and may generate facial cursors for the multiple users based on tracking the faces of the multiple users. For example, multiple users may utilize the display and the user device 105 to browse the display (e.g., images displayed by the display) at same time. The user device 105 may detect and track multiple (e.g., ten, twenty, and/or the like) faces of users and may generate multiple (e.g., ten, twenty, and/or the like) facial cursors to be provided on the display. For example, the display may include a digital display sign outside a retail store where multiple users are standing. The multiple users may perform facial browsing of the display sign and corresponding users may see their corresponding facial cursors moving. In some implementations, the user device 105 may generate heatmaps (e.g., as described above) for the multiple users based on the facial browsing. For example, while the multiple users are performing the facial browsing, the user device 105 and/or the backend system 110 may generate heatmaps that indicate a unique aspect (e.g., a unique color code) for each user and may tag the users browsing journey. This may enable the backend system 110 to determine how different multiple users are browsing at any given point of time.

As further shown in FIG. 1I, and by reference number 175, the user device 105 may track faces of particular users located less than a threshold distance (e.g., ten feet, twelve feet, and/or the like) from the display and may generate facial cursors for the particular users. A user or multiple users may perform facial browsing from the threshold distance from the display and even further distances with better camera resolution (e.g., as long as a face is detected). For example, the user device 105 may control a depth or the z-index corresponding to a distance that a user or users stand from the display and may consider only those users who are nearer to the display based on the threshold distance (e.g., a configurable distance). When the user is further away from the display, the user may be unable to see the facial cursor until the depth or the z-index value is configured accordingly.

In this way, the user device 105 enables facial browsing of a display based on movement of facial features of a user. For example, the user device 105 may provide facial browsing that enables a user to utilize a user face to control and perform actions similar to actions performed by a hardware peripheral, such as hovering, navigating a webpage, scrolling on webpage, selecting objects on a webpage, and/or the like. The user device 105 may generate insights associated with where a user is looking on a webpage based on the facial browsing. The user device 105 may enable a user to navigate and control actions based on facial movements, which facilitates the user experience of browsing. Thus, the user device 105 may conserve computing resources, networking resources, and/or other resources that would have otherwise been consumed by generating poor insights associated with user browsing patterns, generating poor predictions of user intent based on the poor insights, providing incorrect recommendations to users due to the poor insights, providing incorrect recommendations to an online purchasing system due to the poor insights, and/or the like.

In some implementations, the user device 105 or the backend system 115 may utilize data captured from facial browsing by the user to determine whether the user is interested in a particular product, a particular service, a particular advertisement, and/or the like provided by the display. This may enable a vendor of the product, the service, the advertisement, and/or the like to determine whether the user likes the product, the service, the advertisement, and/or the like (e.g., indicating that the webpage or the advertisement is effective). The user device 105 may capture facial browsing data over time to determine how users navigate a webpage. This information may be utilized by the webpage provider to modify the webpage, structure other webpages similarly, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
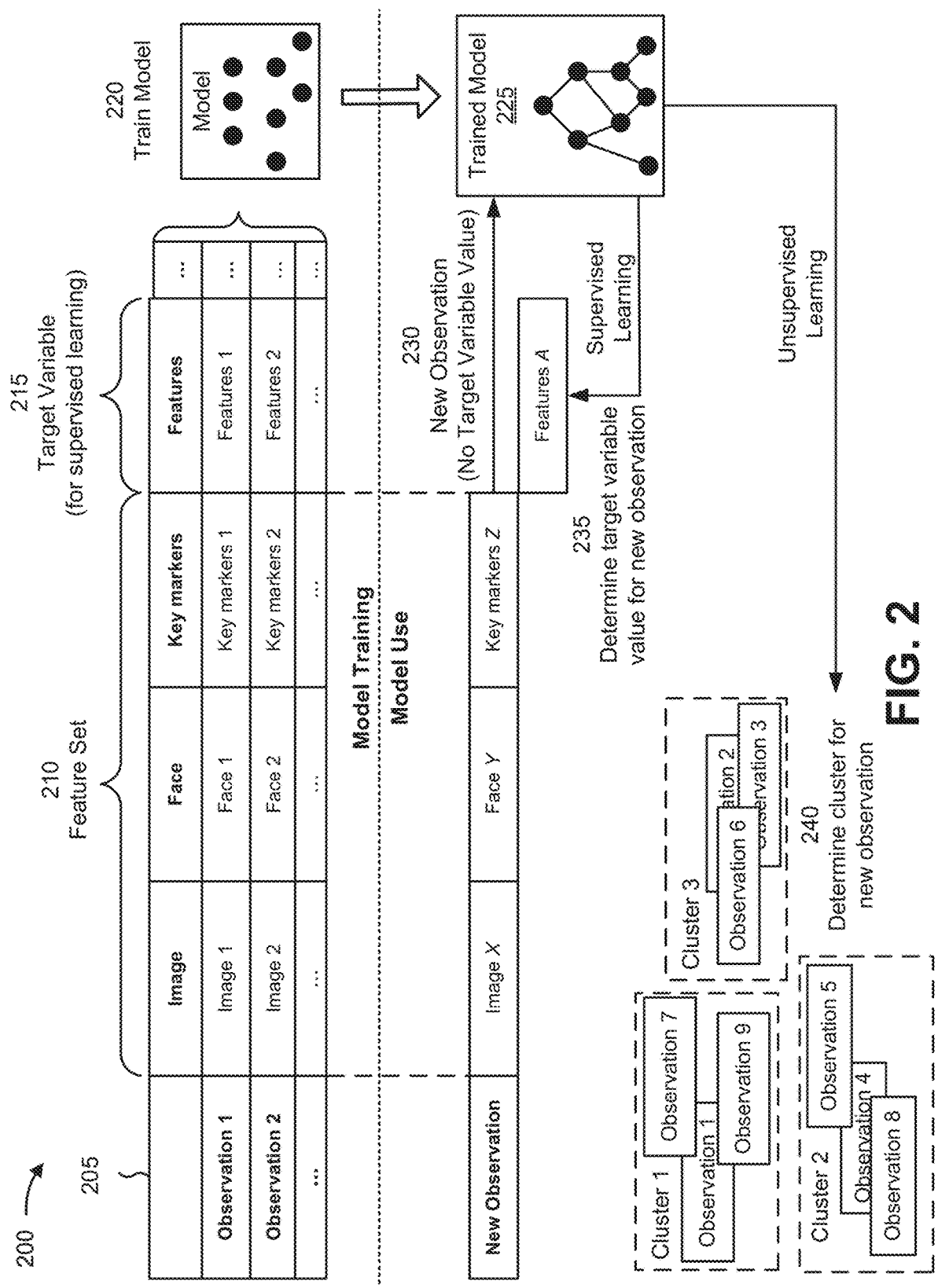
FIG. 2 is a diagram illustrating an example of training and using a machine learning model.

FIG. 2 is a diagram illustrating an example 200 of training and using a machine learning model to enable facial browsing of a display based on movement of facial features of a user. The machine learning model training and usage described herein may be performed using a machine learning system. The machine learning system may include or may be included in a computing device, a server, a cloud computing environment, and/or the like, such as the user device 105 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the user device 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device 105. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of an image, a second feature of a face, a third feature of key markers, and/or the like. As shown, for a first observation, the first feature may have a value of image 1, the second feature may have a value of face 1, the third feature may have a value of key markers 1, and/or the like. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labelled "features" and may include a value of features 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of image X, a second feature of coreference face Y, a third feature of key markers Z, and/or the like, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of features A for the target variable of the features for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an image cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a face cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to enable facial browsing of a display based on movement of facial features of a user. The machine learning system enables recognition and/or identification of tens, hundreds, thousands, or millions of features and/or feature values for tens, hundreds, thousands, or millions of observations, thereby increasing accuracy and consistency and reducing delay associated with enabling facial browsing of a display based on movement of facial features of a user relative to requiring computing resources to be allocated for tens, hundreds, or thousands of operators to manually enable facial browsing of a display based on movement of facial features of a user.

As indicated above, FIG. 2 is provided as an example. Other examples may differ from what is described in connection with FIG. 2.

Figure 3:
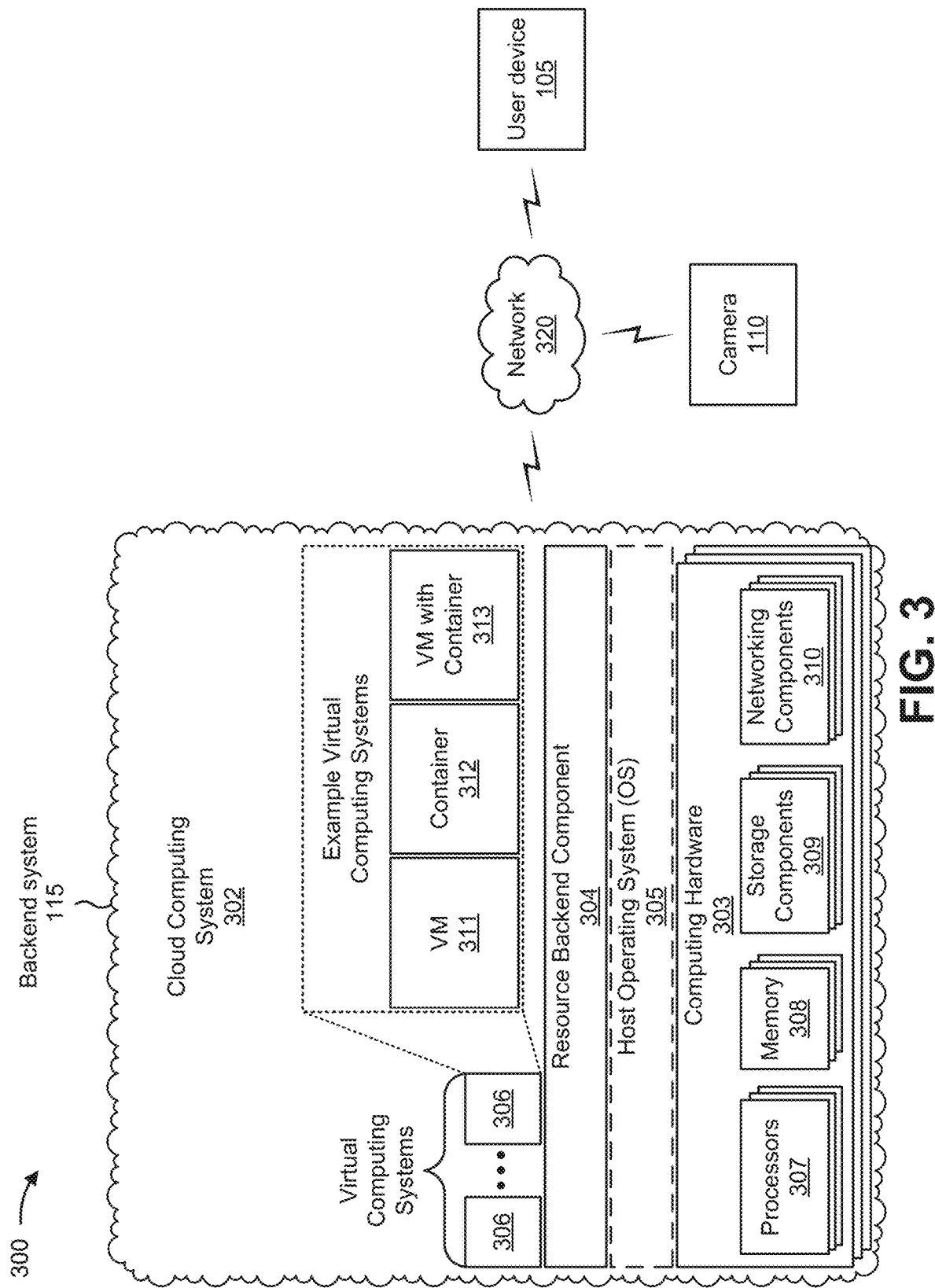
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the backend system 115, which may include one or more elements of and/or may execute within a cloud computing system 302. The cloud computing system 302 may include one or more elements 303-313, as described in more detail below. As further shown in FIG. 3, the environment 300 may include the user device 105 and/or a network 320. Devices and/or elements of the environment 300 may interconnect via wired connections and/or wireless connections.

The user device 105 may include one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The camera 110 may include one or more devices capable of receiving, generating, storing, processing, providing, and/or routing information, as described elsewhere herein. The camera 110 may include a communication device and/or a computing device. For example, the camera 110 may include an optical instrument that captures images, audio, and/or videos (e.g., images and audio). The camera 110 may feed real-time images and/or video directly to the user device 105 or the display of the user device 105, may record captured images and/or video to a storage device for archiving or further processing, and/or the like.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the backend system 115 may include one or more elements 303-313 of the cloud computing system 302, may execute within the cloud computing system 302, and/or may be hosted within the cloud computing system 302, in some implementations, the backend system 115 may not be cloud-based (e.g., may be implemented outside of a cloud computing system) or may be partially cloud-based. For example, the backend system 115 may include one or more devices that are not part of the cloud computing system 302, such as the device 400 of FIG. 4, which may include a standalone server or another type of computing device. The backend system 115 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
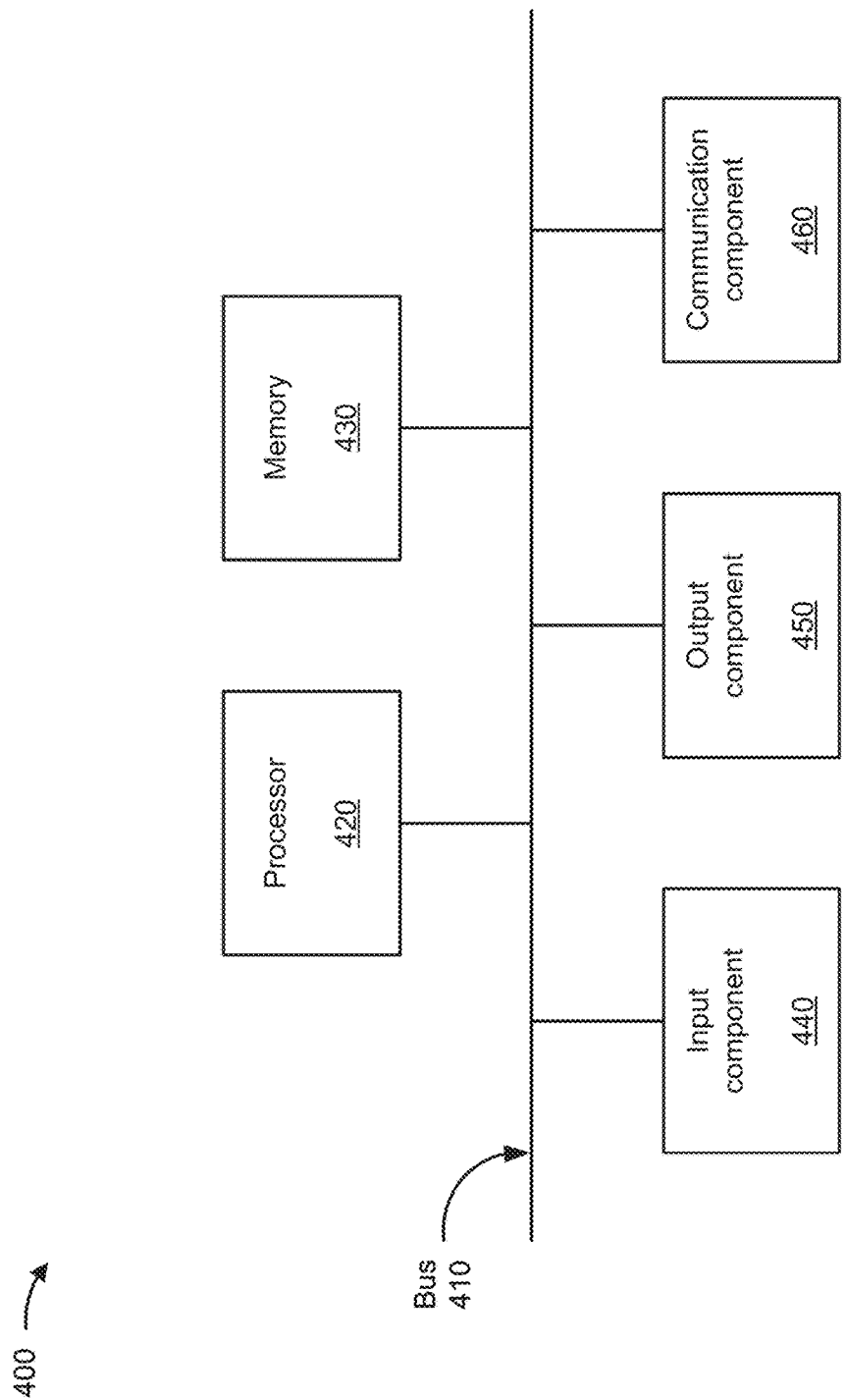
FIG. 4 is a diagram of example components of one or more devices of FIG. 3.

FIG. 4 is a diagram of example components of a device 400, which may correspond to the user device 105, the camera 110, and/or the backend system 115. In some implementations, the user device 105, the camera 110, and/or the backend system 115 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touchscreen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for enabling facial browsing of a display based on movement of facial features of a user. In some implementations, one or more process blocks of FIG. 5 may be performed by a device (e.g., the user device 105). In some implementations, one or more process blocks of FIG. 5 may be performed by another device or a group of devices separate from or including the device, such as a camera (e.g., the camera 110) and/or a backend system (e.g., the backend system 115). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving an image of a user from a camera associated with a display of the user device (block 510). For example, the user device may receive an image of a user from a camera associated with a display of the user device, as described above. In some implementations, the camera is connected to the display of the user device.

As further shown in FIG. 5, process 500 may include processing the image, with a neural network model, to identify a face of the user and key markers of the face (block 520). For example, the user device may process the image, with a neural network model, to identify a face of the user and key markers of the face, as described above.

As further shown in FIG. 5, process 500 may include processing the face and the key markers, with the neural network model, to identify features of the face (block 530). For example, the user device may process the face and the key markers, with the neural network model, to identify features of the face, as described above. In some implementations, the features of the face include one or more of a nose of the face, a left portion of a forehead of the face, a right portion of the forehead of the face, a left ear of the face, a right ear of the face, an upper lip of the face, and a lower lip of the face.

As further shown in FIG. 5, process 500 may include calculating a z-index representing a distance between the face and the display (block 540). For example, the user device may calculate a z-index representing a distance between the face and the display, based on the features, as described above. In some implementations, calculating the z-index representing the distance between the face and the display includes calculating an area of triangle formed by a left portion of a forehead of the face, a right portion of the forehead, and a nose of the face, determining a width and a height of a display area of the display, and calculating the z-index by dividing the width and the height by the area of the triangle.

As further shown in FIG. 5, process 500 may include calculating left and right face rotation along an x-axis of the display (block 550). For example, the user device may calculate left and right face rotation along an x-axis of the display, based on the features, as described above. In some implementations, calculating the left and right face rotation along the x-axis of the display includes identifying a first angle indicating that the face is pointing right; identifying a second angle indicating that the face is pointing left; calculating a first x distance between a nose of the face and a left portion of a forehead of the face, based on the first angle and the second angle; calculating a second x distance between the nose of the face and a right portion of the forehead of the face, based on the first angle and the second angle; dividing the first x distance by the second x distance to obtain a first value; subtracting the first value from one to obtain a second value; and selectively calculating a left face rotation based on the second value being greater than zero or calculating a right face rotation based on the second value being less than or equal to zero.

As further shown in FIG. 5, process 500 may include calculating up and down face rotation along a y-axis of the display (block 560). For example, the user device may calculate up and down face rotation along a y-axis of the display, based on the features, as described above. In some implementations, calculating the up and down face rotation along the y-axis of the display includes identifying locations of a left ear of the face and a right ear of the face; calculating a first distance between a left portion of a forehead of the face and a right portion of the forehead of the face; calculating second distances between a nose of the face and the locations of the left ear and the right ear; and calculating the up and down face rotation based on the first distance and the second distances.

As further shown in FIG. 5, process 500 may include calculating an x-position and a y-position of a cursor on the display based on the left and right face rotation, the up and down face rotation, and the z-index (block 570). For example, the user device may calculate an x-position and a y-position of a cursor on the display based on the left and right face rotation, the up and down face rotation, and the z-index, as described above. In some implementations, calculate the x-position and the y-position of the cursor includes multiplying the left and right face rotation and a coefficient, based on the z-index and a width and a height of a display area of the display, to obtain a first value, multiplying the up and down face rotation and the coefficient to obtain a second value, and calculating the x-position and the y-position of the cursor based on the first value and the second value.

As further shown in FIG. 5, process 500 may include providing the x-position and the y-position of the cursor to the display (block 580). For example, the user device may provide the x-position and the y-position of the cursor to the display, as described above.

In some implementations, process 500 includes performing facial browsing of the display based on movements of the face of the user. In some implementations, performing the facial browsing of the display includes one or more of zooming in on the display based on the face moving toward the display, zooming out of the display based on the face moving away from the display, panning across the display based on the face moving left or right relative to the display, selecting an element provided by the display based on the face staring at the element for a threshold time period, performing a selection function based on the face looking at the display and smiling, performing an accept option based on the face vertically nodding, performing a decline option based on the face horizontally shaking, or performing a swipe function based on the face quickly moving in one direction.

In some implementations, process 500 includes determining cursor positions on the display at different time periods, based on the facial browsing, and generating a heatmap indicating a browsing pattern of the user based on the cursor positions and the different time periods. In some implementations, process 500 includes generating a recommendation for the user based on the heatmap, and providing the recommendation to the display.

In some implementations, process 500 includes performing facial browsing of the display based on movements of the face of the user, determining cursor positions on the display at different time periods, based on the facial browsing, and providing, to a backend system, data identifying the cursor positions and the different time periods, wherein the backend system is configured to generate a heatmap indicating a browsing pattern of the user based on the data identifying the cursor positions and the different time periods. In some implementations, process 500 includes receiving, from the backend system, a recommendation for the user that is generated based on the heatmap, and providing the recommendation to the user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
processing, by a device, an image of a user from a camera associated with a display of the device to identify a face of the user and key markers of the face;
processing, by the device, the face and the key markers to identify features of the face;
determining, by the device, a position of a cursor on the display based on one or more measurements associated with the features of the face, wherein determining the position of the cursor on the display based on the one or more measurements comprises:
    determining a first area associated with two or more features of the features of the face,
    determining a second area associated with a display area of the display, and
    determining the position of the cursor based on the first area and the second area;
enabling, by the device, facial browsing of the display based on determining the position of the cursor and movements of the face of the user;
determining, by the device, cursor positions on the display at different time periods, based on the facial browsing; and
obtaining, by the device, a recommendation for a product or service for the user that is generated based on the facial browsing.

2. The method of claim 1, further comprising:
enabling facial browsing based on utilizing movements of a forehead of the user and a distance of the user from the display.

3. The method of claim 1, further comprising:
tracking multiple faces of multiple users; and
generating facial cursors for the multiple users based on tracking the faces of the multiple users.

4. The method of claim 1, wherein determining the position of the cursor on the display based on the one or more measurements comprises:
    determining an angle associated with the face, and
    determining the position of the cursor based on the angle.

5. The method of claim 1, wherein the user is a first user; and further comprising:
enabling facial browsing for a second user based on determining that the second user is a threshold distance from the display.

6. The method of claim 1, wherein the key markers include one or more points on:
    a forehead,
    an eye,
    an eyebrow, or
    a mouth.

7. The method of claim 1, wherein determining the position of the cursor on the display based on the one or more measurements comprises:
    determining a first measurement based on determining a first feature and a second feature of the features of the face,
    determining a second measurement based on determining the first feature and a third feature of the features of the face, and
    determining the position of the cursor based on the first measurement and the second measurement.

8. A device, comprising:
one or more processors configured to:
    process an image of a user from a camera associated with a display to identify a face of the user and key markers of the face;
    process the face and the key markers to identify features of the face;
    determine a position of a cursor on the display based on one or more measurements associated with the features of the face,
        wherein the one or more processors, to determine the position of the cursor on the display based on the one or more measurements, are configured to:
            determine a first area associated with two or more features of the features of the face,
            determine a second area associated with a display area of the display, and
            determine the position of the cursor based on the first area and the second area;
    enable facial browsing of the display based on determining the position of the cursor and movements of the face of the user; and
    obtain a recommendation for a product or service for the user that is generated based on the facial browsing.

9. The device of claim 8, wherein the one or more processors are further configured to:
disable an indication of the cursor from being displayed based on the user being a threshold distance from the display.

10. The device of claim 8, wherein the one or more processors are further configured to:
generate insights associated with where the user is looking based on the facial browsing.

11. The device of claim 8, wherein the one or more processors, to determine the position of the cursor on the display based on the one or more measurements, are configured to:
    determine a first measurement based on determining a first feature and a second feature of the features of the face,
    determine a second measurement based on determining the first feature and a third feature of the features of the face, and
    determine the position of the cursor based on the first measurement and the second measurement.

12. The device of claim 8, wherein the one or more processors are further configured to:
generate a heatmap based on data identifying cursor positions on the display.

13. The device of claim 8, wherein the user is a first user; and
wherein the one or more processors are further configured to:
    enable facial browsing for a second user based on determining that the second user is a threshold distance from the display.

14. The device of claim 8, wherein the key markers include one or more points on:
    a forehead,
    an eye,
    an eyebrow, or
    a mouth.

15. A non-transitory computer-readable medium storing a set of instructions, the set of instructions comprising:
one or more instructions that, when executed by one or more processors of a device, cause the device to:
    process an image of a user from a camera associated with a display to identify a face of the user and key markers of the face;
    process the face and the key markers to identify features of the face;
    determine a position of a cursor on the display based on one or more measurements associated with the features of the face,
        wherein the one or more instructions, that cause the device to determine the position of the cursor on the display based on the one or more measurements, cause the device to:

determine a first area associated with two or more features of the face, determine a second area associated with a display area of the display, and determine the position of the cursor based on the first area and the second area;

enable facial browsing of the display based on determining the position of the cursor and movements of the face of the user;

determine cursor positions on the display at different time periods, based on the facial browsing; and provide, to a backend system, data identifying the cursor positions and the different time periods, wherein the backend system is configured to generate a heatmap indicating a facial browsing pattern of the user based on the data identifying the cursor positions and the different time periods; and obtain, from the backend system, a recommendation for a product or service for the user that is generated based on the heatmap indicating the facial browsing pattern of the user.

16. The non-transitory computer-readable medium of claim 15, wherein the one or more instructions further cause the device to:

enable facial browsing based on utilizing movements of a forehead of the user and a distance of the user from the display.

17. The non-transitory computer-readable medium of claim 15, wherein the one or more instructions further cause the device to:

track multiple faces of multiple users; and generate facial cursors for the multiple users based on tracking the faces of the multiple users.

18. The non-transitory computer-readable medium of claim 15, wherein the one or more instructions, that cause the device to determine the position of the cursor on the display based on the one or more measurements, cause the device to:

determine an angle associated with the face, and determine the position of the cursor based on the angle.

19. The non-transitory computer-readable medium of claim 15, wherein the key markers include one or more points on:

a forehead, an eye, an eyebrow, or a mouth.

20. The non-transitory computer-readable medium of claim 15, wherein the one or more instructions, that cause the device to determine the position of the cursor on the display based on the one or more measurements, cause the device to:

determine a first measurement based on determining a first feature and a second feature of the features of the face, determine a second measurement based on determining the first feature and a third feature of the features of the face, and determine the position of the cursor based on the first measurement and the second measurement.

* * * * *